United States Patent [19]
Manasse

[11] Patent Number: 5,802,497
[45] Date of Patent: Sep. 1, 1998

[54] METHOD AND APPARATUS FOR CONDUCTING COMPUTERIZED COMMERCE

[75] Inventor: Mark S. Manasse, San Francisco, Calif.

[73] Assignee: Digital Equipment Corporation, Maynard, Mass.

[21] Appl. No.: 500,038

[22] Filed: Jul. 10, 1995

[51] Int. Cl.$^6$ ................................................. G06F 17/60
[52] U.S. Cl. ................................................. 705/27; 705/44
[58] Field of Search ................................... 395/226, 227, 395/234, 240, 244; 380/24, 30, 21, 4; 705/20, 27, 34, 40, 44

[56] References Cited

U.S. PATENT DOCUMENTS

| 5,285,383 | 2/1994 | Lindsey et al. | |
|---|---|---|---|
| 5,339,361 | 8/1994 | Schwalm et al. | |
| 5,557,518 | 9/1996 | Rosen | 380/24 |
| 5,590,197 | 12/1996 | Chen et al. | 380/24 |
| 5,613,012 | 3/1997 | Hoffman et al. | 235/380 |

OTHER PUBLICATIONS

"Network Security via Private-Key Certificates", MIT Project Athena; Don Davis and Ralph Swick; pp. 64–67. No date.
"NetBill: An Internet Commerce System Optimized for Network Delivered Services"; Marvin Sirbu and T.D. Tygar, Carnegie Mellon University. No date supplied.
"Payment Switches for Open Networks"; David K. Gifford, Lawrence C. Stewart, Andrew C. Payne, G. Winifield Treese; Open Market Inc. No date supplied.
"Achieving Electronic Privacy"; Mar. 14, 1995; David Chuam; pp. 1–9.
"NetCash: A design for practical electronic currency on the Internet"; Gennady Medvinsky, B. Clifford Neuman; Information Sciences Institute, University of Southern California, Nov. 1993.
"Internet Billing Service Design and Prototype Implementation"; Marvin A. Sirbu; pp. 1–19.
"The Green Commerce Model"; Oct., 1994; Lee H. Stein, Elinar A. Stefferud, Nathaniel S. Borenstein, Marshall T. Rose; pp. 1–19.
"Anonymous Credit Cards"; Steven H. Low, Nicholas F. Maxemchuk and Sanjoy Paul, AT&T Bell Laboratories; pp. 1–10.

Primary Examiner—Donald E. McElheny, Jr.
Attorney, Agent, or Firm—Kenneth F. Kozik; Ronald C. Hudgens; Arthur W. Fisher

[57] ABSTRACT

A method of conducting computerized commerce on a number of computer systems connected by a computer network including providing a broker computer system, the broker system having a database of broker scrips, each of the broker scrips representing a form of electronic currency, providing a vendor computer system, the vendor computer system having a database containing products which may be exchanged for the broker scrips, the vendor computer system capable of providing vendor scrips, providing a consumer computer system, the consumer computer system having a user interface wherein a user may initiate transactions in the consumer computer system to obtain one or more of the products contained in the database of the vendor computer system, sending a first request from the user on the consumer computer system to obtain a first broker scrip from the broker computer system, processing the first request in the broker computer system, sending the first broker scrip to the consumer computer system in response to the step of processing, sending a second request from the broker computer system to obtain a first vendor scrip from the vendor broker computer system, processing the second request in the vendor computer system, sending the first vendor scrip to the broker computer system in response to the step of processing the second request, sending a third request from the consumer computer system to the broker computer system for a first product, exchanging the first broker scrip for the first vendor scrip, and delivering the product to the consumer computer system in response to the step of exchanging.

22 Claims, 7 Drawing Sheets

METHOD AND APPARATUS FOR CONDUCTING COMPUTERIZED COMMERCE

FIELD OF THE INVENTION

This invention relates generally to networked computer systems, and more particularly to using networked computer systems to conduct commerce.

BACKGROUND OF THE INVENTION

With the advent of electronic forms of communication, telegraph, telephone, radio, television, and more recently digital networks, it has become possible to conduct commerce electronically using digital computer systems. Electronically encoded funds are different than physical currency in that it is a trivial matter to duplicate electronic representations of funds. The most difficult task faced in conducting computerized commerce is to detect the illegal re-use of electronic funds, and to detect the illegal re-use of funds, e.g., double spending.

Known electronic fund transfer systems generally require a "trusted" third party, between the vendor and consumer, to authenticate the validity of the electronic funds. The requirement of a third party adds expense to every transaction because of the cost of extra communications, and extra encryption. In addition, current electronic fund transfer networks, e.g. Western Union, and the Federal Reserve banks, typically require physically secure communications media which is immune to "eavesdropping." Such secure networks are generally not available to consumers at large.

Alternative methods of electronic fund transactions involve establishing a relationship between the vendor and consumer, either through a subscription service, or billing accounts as are provided by credit card organizations. These methods are efficient at handling transaction requests, assuming a reasonable authentication scheme. However, these methods require a prior effort to establish an "account" or credit worthiness. For a large number of consumers, e.g. all potential users of a large network of computers known as internet, setting up accounts, and maintaining credit information adds expenses to the system.

The recent growth of public access communications networks, such as Internet, has accelerated the need for a low-cost computerized commerce system. In addition, in the information market place there is a particular need to economically support transactions that are for amounts as small as a hundredth of a cent. For example, single "pages" of copyrighted material in multi-media network repositories. Current computerized commerce systems, generally have transaction costs which far exceed the value of the products traded in "micro-commerce."

Also current systems, using, for example, credit card organizations, have a low level of consumer privacy, since they maintain centralized records of purchases, and usually have a single point of trust.

Therefore, it is desired to provide a computerized commerce system which has a very low cost for processing transactions. The system should be interactive, accurate, with verifiable billing. In addition, the system should be theft proof.

SUMMARY OF THE INVENTION

A method of conducting computerized commerce on a number of computer systems connected by a computer network is provided including providing a broker computer system, the broker system having a database of broker scrips, each of the broker scrips representing a form of electronic currency, providing a vendor computer system, the vendor computer system having a database containing products which may be exchanged for the broker scrips, the vendor computer system capable of providing vendor scrips, providing a consumer computer system, the consumer computer system having a user interface wherein a user may initiate transactions in the consumer computer system to obtain one or more of the products contained in the database of the vendor computer system, sending a first request from the user on the consumer computer system to obtain a first broker scrip from the broker computer system, processing the first request in the broker computer system, sending the first broker scrip to the consumer computer system in response to the step of processing, sending a second request from the broker computer system to obtain a first vendor scrip from the vendor broker computer system, processing the second request in the vendor computer system, sending the first vendor scrip to the broker computer system in response to the step of processing the second request, sending a third request from the consumer computer system to the broker computer system for a first product, exchanging the first broker scrip for the first vendor scrip, and delivering the product to the consumer computer system in response to the step of exchanging.

With such an arrangement, a scheme which allows charging for services and information at prices best measured in fractions of a penny is provided.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
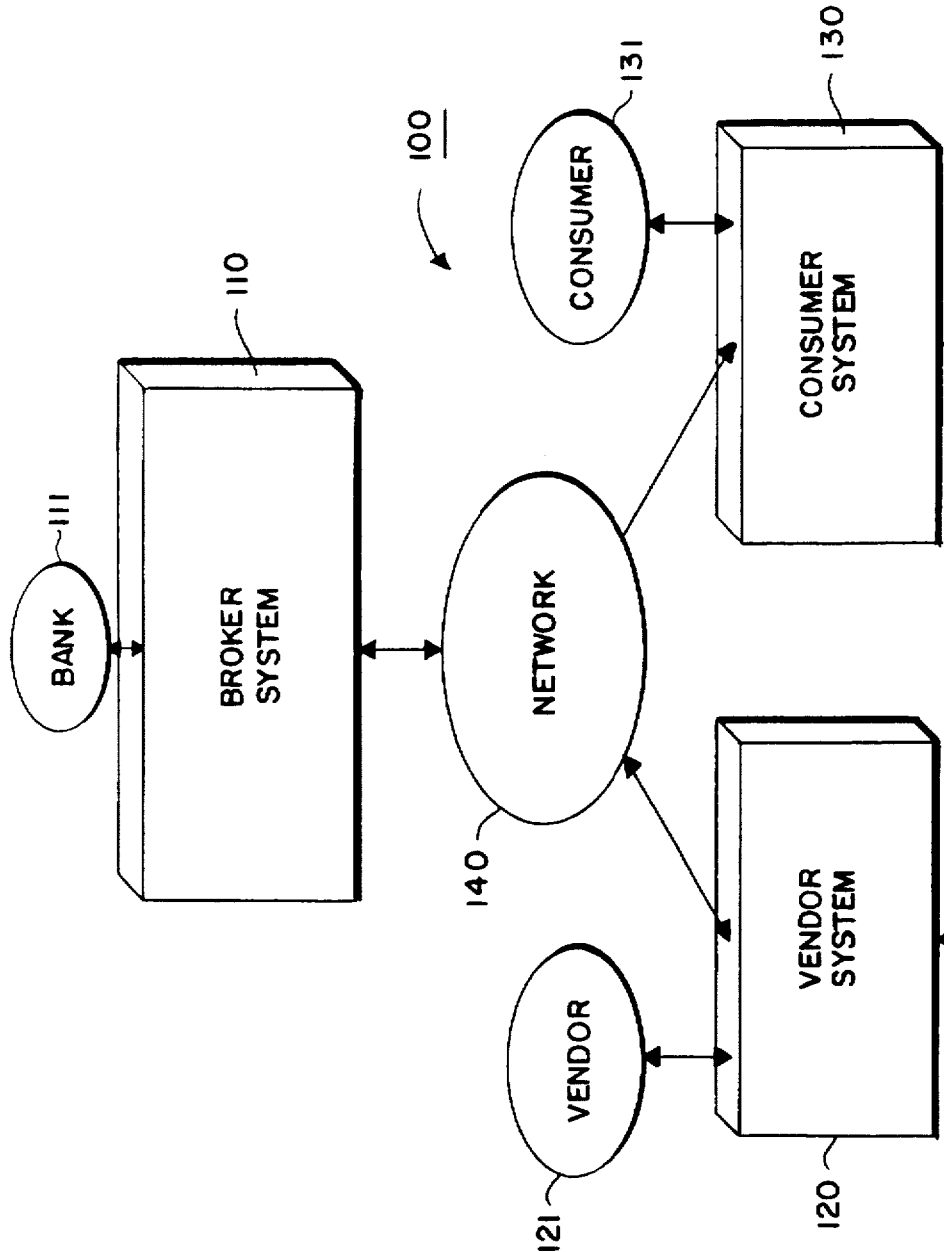
FIG. 1 is a top-level block diagram of a computerized system for conducting computerized commerce.

FIG. 1 shows a computerized system 100 for conducting computerized commerce according to the principles of the invention. The system 100 includes a broker system 110, a vendor system 120, and a consumer system 130 interconnected by a communications network 140.

For clarity, the system 100 depicted in FIG. 1 shows only single broker, vendor, and consumer systems. In actual practice, any number of broker, vendor, and consumer systems can be interconnected by the network 140.

The user 111 of the broker system 110 can be a bank, a credit provider, or other types of financial services institutions. The vendor system 120 is operated by a vendor 121. The vendor 121 provides products for consumers.

A consumer 131 can use the consumer computer system 130 to "electronically" acquire the products 150 of the vendor 121. The products 150 provided by the vendor 121 can be goods and service of any type. The network 140 can be public or private, such as, for example, internet, switched telephone systems, satellite linked networks, and the like.

Figure 2:
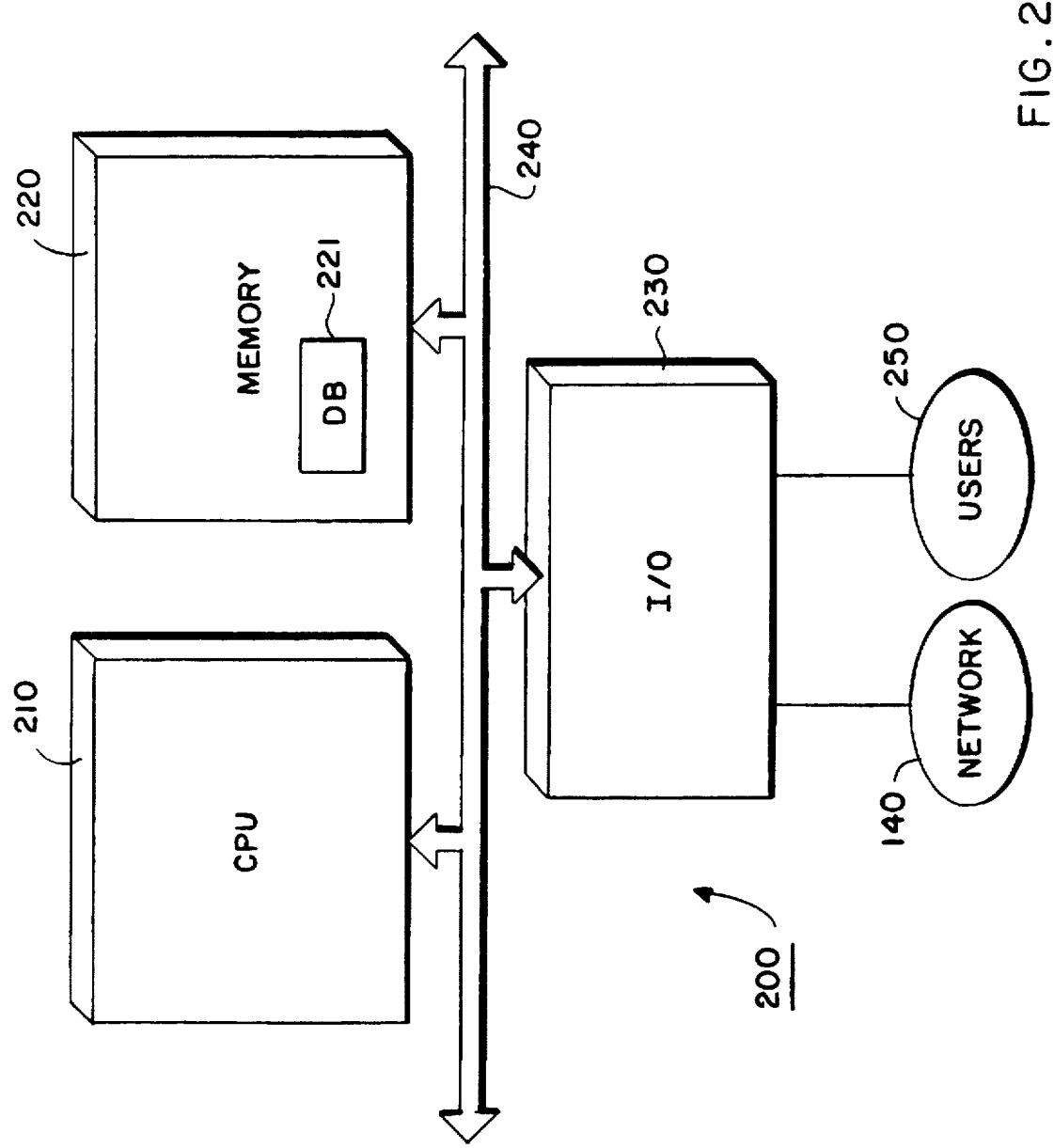
FIG. 2 is a block diagram of a computer system used in the system of FIG. 1.

A computer system 200 suitable for use as the broker, vendor, and consumer systems is shown in FIG. 2. The computer system 200 includes a central processing unit (CPU) 210, a memory 220, and an input/output interface 230 connected to each other by a communications bus 240. The CPU 210, at the direction of users 250, e.g. broker, vendor, consumer, executes software programs for manipulating data. The programs and data can be stored in the memory 220 as a database (DB) 221.

The memory 220 can include volatile semiconductor memory as well as persistent storage media, such as disks. The I/O interface 230 is for communicating data with the network 140, the users 250, and other computer system peripheral equipment, such as printers, tapes, etc.

The computer system 200 is scaled in size to function as the broker, vendor, or consumer systems. For example, when scaled as the consumer computer system 130, the computer system 200 can be a small personal computer (PC), fixed or portable. The configurations of the computer system 200 suitable for use by the broker 111 and the vendor 121 may include multiple processors and large database equipped with "fail-safe" features. The fail-safe features ensure that the database 221 is securely maintained for long periods of time.

Figure 3:
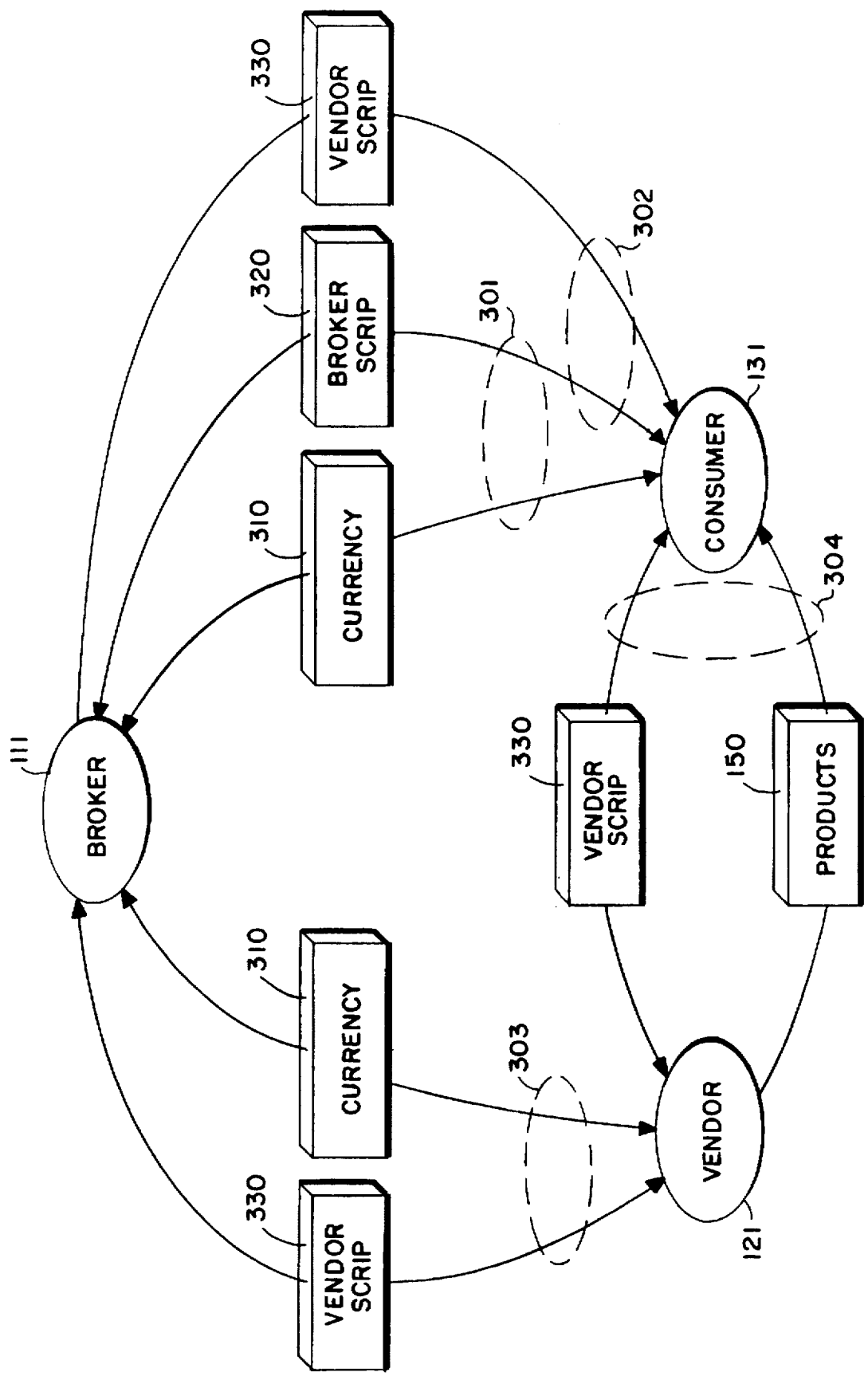
FIG. 3 is a flow diagram of the operations of the system of FIG. 1.
Figure 3A:
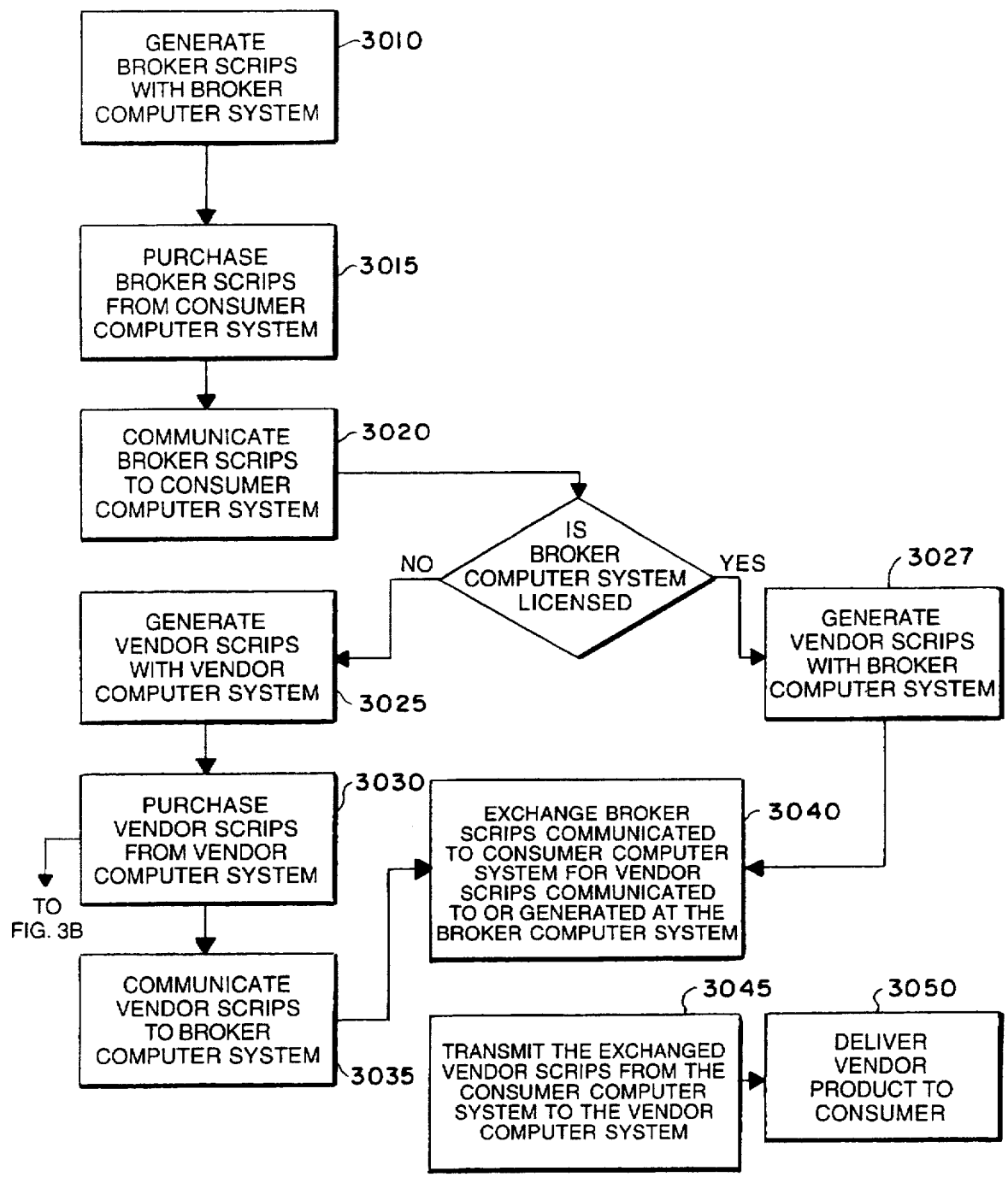
FIG. 3A is a flow chart of certain operations depicted in FIG. 3.

FIG. 3 and FIG. 3A show an operation of the system 100 according to a preferred embodiment of the invention. The consumer 131 in step 3015 using, for example, "currency" 310 purchases "electronic" broker scrip 320 generated in step 3010 by the broker 111. Here, purchasing means that upon a validation of the authenticity of the consumer 131 and the consumer's currency 310, the broker system 110 generates signals, in the form of data records. The signals in step 3020 are communicated, via the network 140, to the consumer system 130 for storage in the database 221 of the memory 220 of the consumer system 130.

The currency 310 which is exchanged for scrip 320 can be cash, check, credit card, bank ATM card, debit card, phone card, or other items of value. The scrip 320 can also be freely exchanged for "coupons" frequently used in promotional schemes. The "coupons" can be in form of the scrip.

The scrip, according to the preferred embodiment of the invention, is described in further detail below. In brief, the scrip is encoded by the generator of the scrip. This means that the scrip carries encrypted information which is only decipherable by the originator. In addition, each scrip is uniquely identifiable. After a single use, the originator of the scrip can "invalidate it." Invalidated meaning that the signals of the data record are no longer accepted for processing by the originating computer system.

The broker 111, in a similar transaction 303, as described above, exchanges currency 310 for bulk electronic vendor scrip 330 in step 3030 and 3035. The vendor scrip 330 is generated in step 3025 by the vendor system 120. Alternatively, the broker system 110 in step 3027 executes licensed software programs which generate vendor scrip 330 for the consumer 131 as needed. In this case, the "value" of the license can be proportional to the amount of scrip that the licensee can generate. As will be described below, the scrip can have an expiration date so that the issuer does not forever need to maintain data regarding the issued scrip.

The consumer 131 desiring the products 150 provided by the vendor 121, in a transaction 303, can exchange as shown in steps 3040 and 3045, the broker scrip 320 for vendor scrip 330 in a transaction 302. If the purchase price of the product 150 is less than the value of the vendor scrip 330, new vendor scrip can be issued for the balance as "change." A separate transaction type allows consumers 131 to ask vendors 121 to turn vendor scrip 330 back into currency 310 or broker scrip 320, probably for a fee.

Figure 3B:
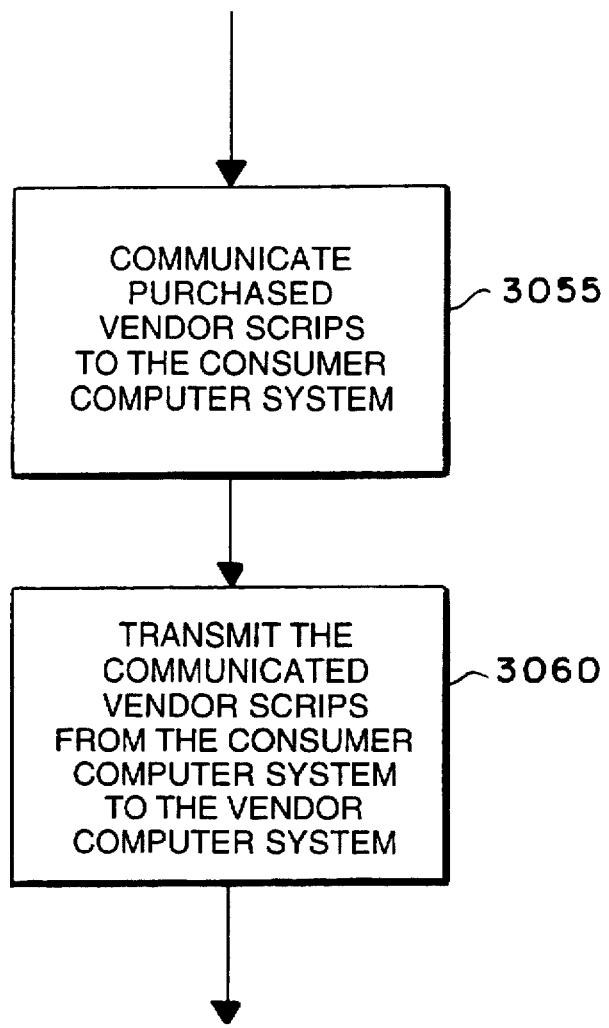
FIG. 3B is a flow chart of other operations depicted in FIG. 3.

In an alternative embodiment shown in FIG. 3, FIG. 3A and FIG. 3B, the consumer 131 can establish an "account" with the vendor 121 to acquire vendor scrip 330 directly, without the need of a third party broker as indicated in steps 3055 and 3060. Establishing an account means that an account data record is maintained in the vendor computer system 120.

The consumer 131, in a transaction 304, submits in step 3045, the vendor scrip 330 to the vendor 121. The vendor 121 decrypts the vendor scrip 330 to verify its authenticity, and to validate the "currency" amount. Verification also checks the local database to determine whether the scrip is previously unspent. Approval of the transaction 303 results in the delivery of the desired product 150 to the consumer 131 in step 3050. In the transaction 304, change can also be returned to the consumer 131 in the form of vendor scrip having a value which is the amount of the over-payment, e.g., another data record communicated by the network 140.

As an advantage of the system 100, privacy of the consumer is protected. The broker supplying the vendor scrip could determine what the consumer was acquiring, if the transaction were observed, but the broker isn't a required party to the transaction. Thus, it is unlikely for the broker to know what products are being acquired, but not impossible. The vendor 121 does not need to know the identity of the consumer 131. The vendor 121 only needs to ensure that valid vendor scrip 330 is being exchanged for products 150. In other words, the databases of the broker, vendor, and consumer are separately and securely maintained, using methods and systems for "fire-walling" computer systems and databases that are known in the art.

The electronic signals which represent the scrip, and which are processed and communicated by the system 100 are described with reference to FIG. 4. The signals, while held static in the memory 220, can be observed as data records 410 of the database 221.

Figure 4:
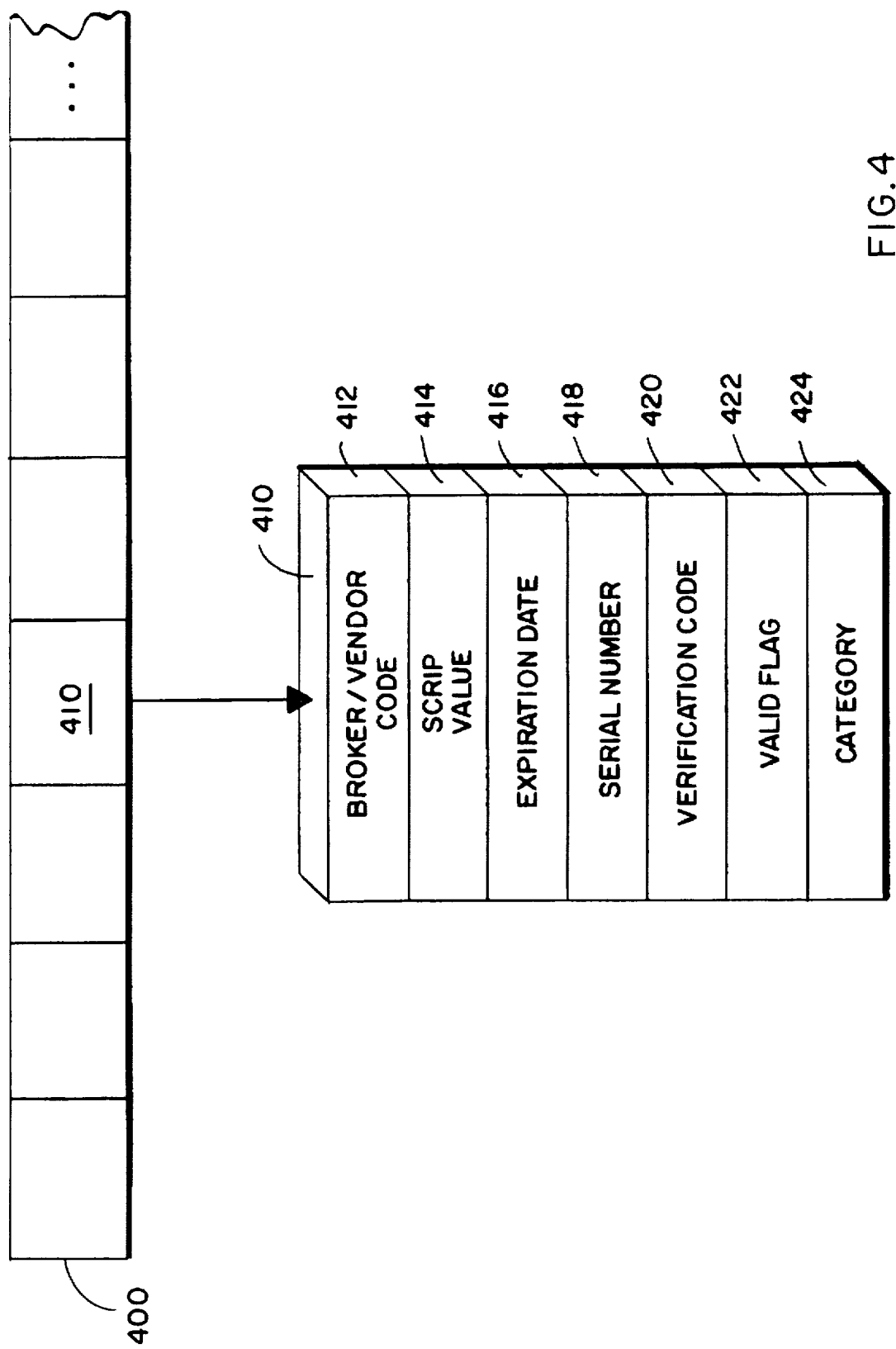
FIG. 4 is a block diagram of data records storing signals representing scrip used in the system of FIG. 1.

FIG. 4 shows a scrip log 400 maintained by the broker and vendor systems as, for example databases 221 of FIG. 2. The log 400 includes a plurality of scrip records 410. Each record 410 is stored in the log 400 when the "scrip" is generated. After the record 410 is generated, a copy of the record is communicated to the requester. Each record 410 includes a broker/vendor code 412, a scrip value 414, an expiration date 416, a serial number 418, a verification code 420, a valid flag 422, and a category 424.

The broker/vendor code 412 uniquely identifies the generator, e.g., the broker or vendor that generated the scrip. The scrip value 414 can be of any unit value exchangeable for the currency 310. The scrip value 414 can be in amounts different than those available by the currency 310. For example, the scrip value can be expressed as amounts which are multiples of fractions of cents. e.g. $\frac{1}{100}$ of one cent.

The expiration date 416 determines when the generated scrip becomes absolutely invalid. The expiration date 416 can be expressed in, for example, minute, hours, or days, or combinations thereof. The use of an expiration date 416 simplifies the bookkeeping task of the vendor and broker. Scrip which has "expired" can be deleted from the log 400. The expiration date 416 also eliminates the circulation of "stale" scrip.

The serial number 418 uniquely identifies the scrip record 410. The serial number 418 can be compared to the serial number which is used for paper currencies. The broker and vendor can use the serial number 418 to locate records in the log 400, and to ensure that the value 414 concurs with serial number 418.

The verification code 420 can be random, but the data storage requirements are minimized by picking a secret that covers a range of serial numbers, and generating the code 420 by computing a function depending on the value 414, serial number 418, and the secret; for example, by computing the MD-5 hash value of the rest of the data fields followed by the secret.

MD-5 or SHA signing can also be used to transmit proof that the sender knows the verification code 420 without requiring the transmission of that code 420. To send message M proving possession of secret S, one sends M followed by the hash result of M followed by S; the recipient, knowing that S is required to validate M, can also compute the hash value, and compare the results. The valid flag 422 is set when the scrip is generated. Use of the scrip clears the flag 420. Thus, receipt of a fraudulently duplicated script record can be recognized. Scrip used once, in most cases, can never be used again.

The category 424 enables the offering of scrip which has inherent price differentials for qualifying consumers, e.g. student, senior citizen, or other special interest groups of consumers. The category 424 can also distinguish scrip as to its intended use. For example, scrip can be issued which has restrictions by age and product, for example, minors and tobacco products. The category information 424 is produced by the broker, who can verify such information once and pass it on to all vendors, allowing the use of stronger cryptographic techniques to authenticate customer data.

Similarly, scrip communicated to identifiable geographic regions of the network 140, can not be exchanged for products in violation of territorial boundaries, and export rules. Scrip can further be categorized to identify specific products, quantity of products, and time-of-use, e.g., "quotas."

Figure 5:
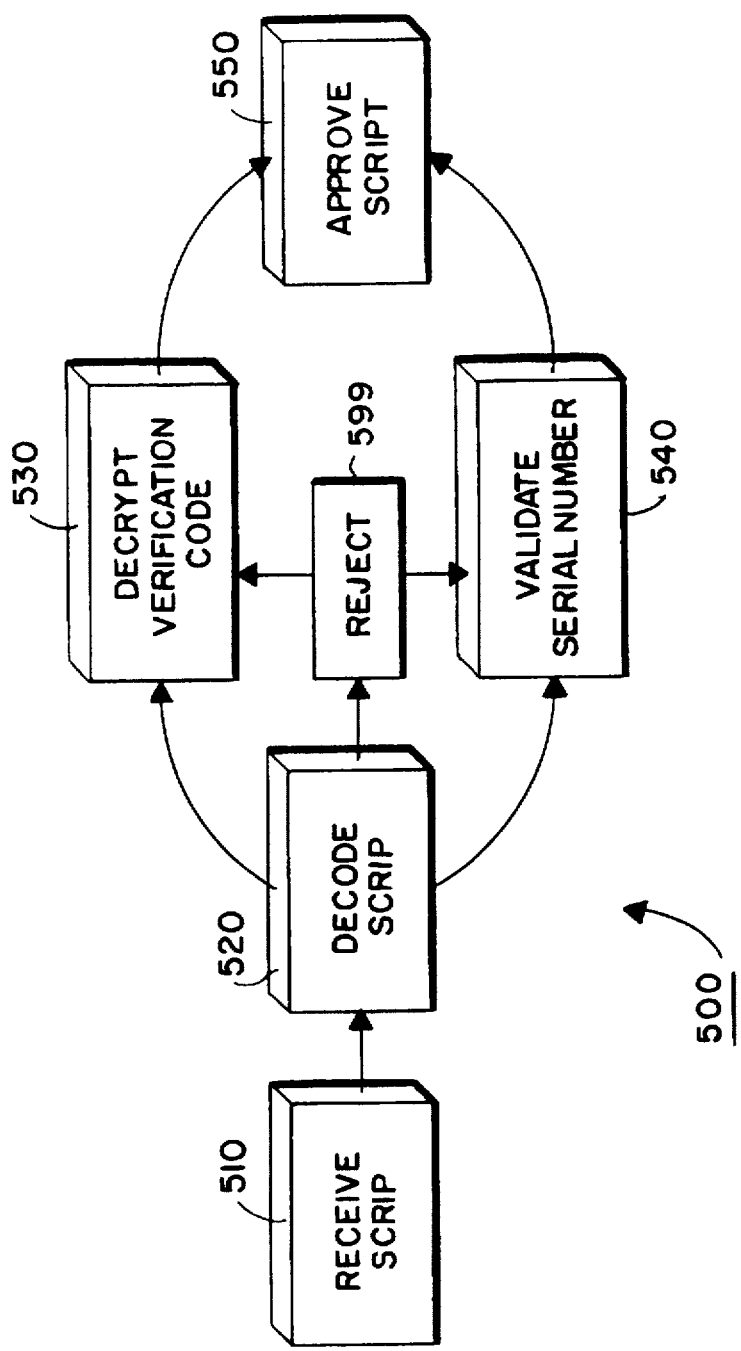
FIG. 5 is a flow diagram of a process used to validate the data records of FIG. 4.

A process 500 which manipulates the signals representing the scrip is shown in FIG. 5. In general, each scrip transaction involves a request, and a response. If the signals indicating the request do not arrive, they may be retransmitted. If the response is lost, then, the scrip which is part of the response may also be lost. However, if the last transaction can be exactly repeated, an immediate subsequent receipt of an identical request by the identical consumer may be honored.

In step 510, scrip is received. The receiver of scrip decrypts the scrip according to methods which are only known to the originator of the scrip. If the scrip can not be decoded, the scrip is rejected in step 599. The verification code 420 is examined in step 530, while the serial number 418 is validated in step 640. If both are found to be correct, the scrip is approved in step 550. Otherwise, the scrip is rejected, step 599. Approval of the scrip allows the release of the product 150. For example, the scrip can be exchanged for information stored in the network 140.

The scrip can be "serialized." This means that the vendor, as long as the consumer maintains a license, will exchange, along with the product, new scrip which can be used in a subsequent transaction. This type of interchange would be of use for serialized products, such as periodic literature, or other products which are repeatedly ordered. Similarly, the system 100 as described herein, can be used to control access to services provided by the vendor for member consumers. As long as the consumer continues to be a member, scrip from the consumer will be accepted.

The scrip does not need to become invalid after use. By vendor's choice, scrip can be accepted a multiple number of times, or even, duplicated scrip may be exchanged for promotional products during specified periods of time. Scrip can be generated conditionally. That is the category 424 of the scrip indicates what other conditions may need to be satisfied by the consumer before the scrip becomes "active." For example, scrip can be activated only if the consumer first engages in a specified set of conditional prerequisite transactions.

Scrip, in a widely distributed network such as internet, can be distributed as "stamps" for electronic mail, e.g., "e-mail." Here, the scrip would allow for recovering expenses associated with mailing, forwarding, distribution, moderating e-mail.

The system 100, as described, operates in a manner which is distinct from systems of the prior art. Consumers do not need to establish credit accounts with product provider. Consumers can easily verify that the transactions for which they are held responsible are valid.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of conducting computerized commerce on a plurality of computer systems connected by a computer network comprising the steps of:

storing a database of products in a vendor computer system;

generating a plurality of vendor scrips in the vendor computer system;

generating a plurality of broker scrips in a broker computer system;

purchasing a first of the generated broker scrips from the broker computer system, the first broker scrip being transmitted to a consumer computer system;

receiving the first broker scrip in the broker computer system from the consumer computer system;

validating the first broker scrip in the broker computer system;

exchanging a first of the vendor scrips received in the broker computer system for the validated first broker scrip;

transmitting the first vendor scrip to the vendor computer system;

validating the first vendor scrip; and transmitting a product to the consumer.

2. The method of conducting computerized commerce according to claim 1 wherein each of the plurality of scrips is encoded and includes:

a broker/vendor code field;

a scrip value field;

an expiration date field;

a serial number field;

a verification code field;

a valid flag field; and a category field.

3. The method of conducting computerized commerce according to claim 2 wherein the step of purchasing the first broker scrip from the broker computer system comprises the step of exchanging currency for the first broker scrip, the currency selected from any one of:

credit card; and computerized virtual cash equivalents.

4. The method of conducting computerized commerce according to claim 1 wherein the step of validating the first broker scrip comprises the steps of:

verifying that the first broker scrip has a correct number of data fields;

verifying that the first broker scrip is unspent;

verifying that the first broker scrip is signed;

verifying that the first broker scrip has sufficient value for the product;

verifying that a user credential is adequate; and signaling a result of the validation.

5. The method of conducting computerized commerce according to claim 4 wherein the step of signaling comprises the steps of:

marking the scrip serial number as spent in the broker computer system if the validation is successful; and sending an error message if the validation is unsuccessful.

6. The method of conducting computerized commerce according to claim 1 wherein the step of validating the first vendor scrip comprises the steps of:

verifying that the first vendor scrip has a correct number of data fields;

verifying that the first vendor scrip is unspent;

verifying that the first vendor scrip is signed;

verifying that the first vendor scrip has sufficient value for the product;

verifying that a user credential is adequate; and signaling a result of the validation.

7. The method of conducting computerized commerce according to claim 6 wherein the step of signaling comprises the steps of;

marking the scrip serial number as spent in the vendor computer system if the validation is successful; and sending an error message if the validation is unsuccessful.

8. The method of conducting computerized commerce according to claim 1, wherein the broker computer system further includes the capability of generating a vendor scrip.

9. A method of conducting computerized commerce on a plurality of computer systems connected by a computer network comprising the steps of:

sending a first request from a consumer computer system to obtain a first broker scrip, representing electronic currency, from a broker computer system;

processing the first request in the broker computer system;

sending the first broker scrip to the consumer computer system in response to the processing;

sending a second request from the broker computer system to obtain a first vendor scrip from a vendor computer system;

processing the second request in the vendor computer system;

sending the first vendor scrip to the broker computer system in response to the processing of the second request;

sending a third request from the consumer computer system to the broker computer system for a first product;

exchanging the first broker scrip for the first vendor scrip; and delivering the product to the consumer computer system in response to the exchanging.

10. The method of conducting computerized commerce according to claim 9 wherein each of the broker and vendor scrips are encoded and include:

a broker/vendor code field;

a scrip value field;

an expiration date field;

a serial number field;

a verification code field;

a valid flag field; and a category field.

11. The method of conducting computerized commerce according to claim 9 wherein the step of processing the first request comprises the steps of:

validating authenticity of a user;

receiving a currency from the user;

validating the currency of the user;

generating the first broker scrip, the first broker scrip having an appropriate broker/vendor code field, a scrip value field, an expiration date field, a serial number field, a verification code field, a valid flag field, and a category field; and encoding the first broker scrip.

12. The method of conducting computerized commerce according to claim 9 wherein the step of processing the second request comprises the steps of:

validating authenticity of the broker computer system;

receiving a currency from the broker computer system;

validating the currency of the broker computer system;

generating the first vendor scrip, the first vendor scrip having an appropriate broker/vendor code field, a scrip value field, an expiration date field, a serial number field, a verification code field, a valid flag field, and a category field; and encoding the first vendor scrip.

13. The method of conducting computerized commerce according to claim 9 wherein the exchanging of the first broker scrip for the first vendor scrip comprises the steps of:

decoding the first vendor scrip;

verifying the authenticity of the first vendor scrip;

terminating the method if the step of verifying fails;

validating the scrip value;

terminating the method if the step of validating fails; and returning a second vendor scrip to the consumer computer system if the scrip value of the first vendor scrip exceeds the scrip value of the first broker scrip.

14. A system for conducting computerized commerce over a network, comprising:

a first computer system for generating a first scrip, the first scrip including information indicating an originator of the first scrip and a value of the first scrip, the first computer system including a memory for storing signals representing the first scrip, and being configured to communicate the first scrip over the network;

a second computer system for generating a request for the first scrip generated by the first computer system, and for receiving the first scrip, after the request is approved, over the network;

wherein the first computer system is further configured to receive the first scrip from the second computer system over the network, to approve the first scrip, and responsive to the approving of the first scrip to authorize a commercial transaction having a value less than or equal to the value of the first scrip.

15. A system for conducting computerized commerce comprising:

a memory configured to store broker scrip and vendor scrip;

an interface interconnected to a network and configured to receive information communicated over the network and to transmit information over the network; and a processing unit configured (i) to retrieve the broker scrip from the memory responsive to a request received from a customer via the network by the interface, (ii) to instruct the interface to transmit the retrieved broker scrip to the customer via the network, and (iii) to retrieve the vendor scrip responsive to the broker scrip being received from the customer via the network by the interface;

wherein the retrieved vendor scrip is usable to authorize delivery of a vendor product to the customer.

16. A system according to claim 15, wherein the processing unit is further configured to generate the broker scrip.

17. A system according to claim 15, wherein the processing unit is further configured to generate the broker scrip and the vendor scrip.

18. A system according to claim 15, wherein:

the vendor product is received by the interface from the vendor via the network; and the processing unit is further configured to instruct the interface to transmit the vendor product to the customer via the network.

19. A system according to claim 15, wherein the processing unit is further configured to instruct the interface to transmit the retrieved vendor scrip to the vendor via the network.

20. A system according to claim 15, wherein the memory is further configured to store the vendor product.

21. A method according to claim 1, wherein exchanging the first vendor scrip for the validated first broker scrip includes transmitting a second of the generated broker scrips to the consumer computer system.

22. A method according to claim 14, wherein the information included in the first scrip is encrypted.

* * * * *